(No Model.)
H. P. CHRISTIANSEN.
HYDRAULIC MOTOR.
No. 428,829. Patented May 27, 1890.
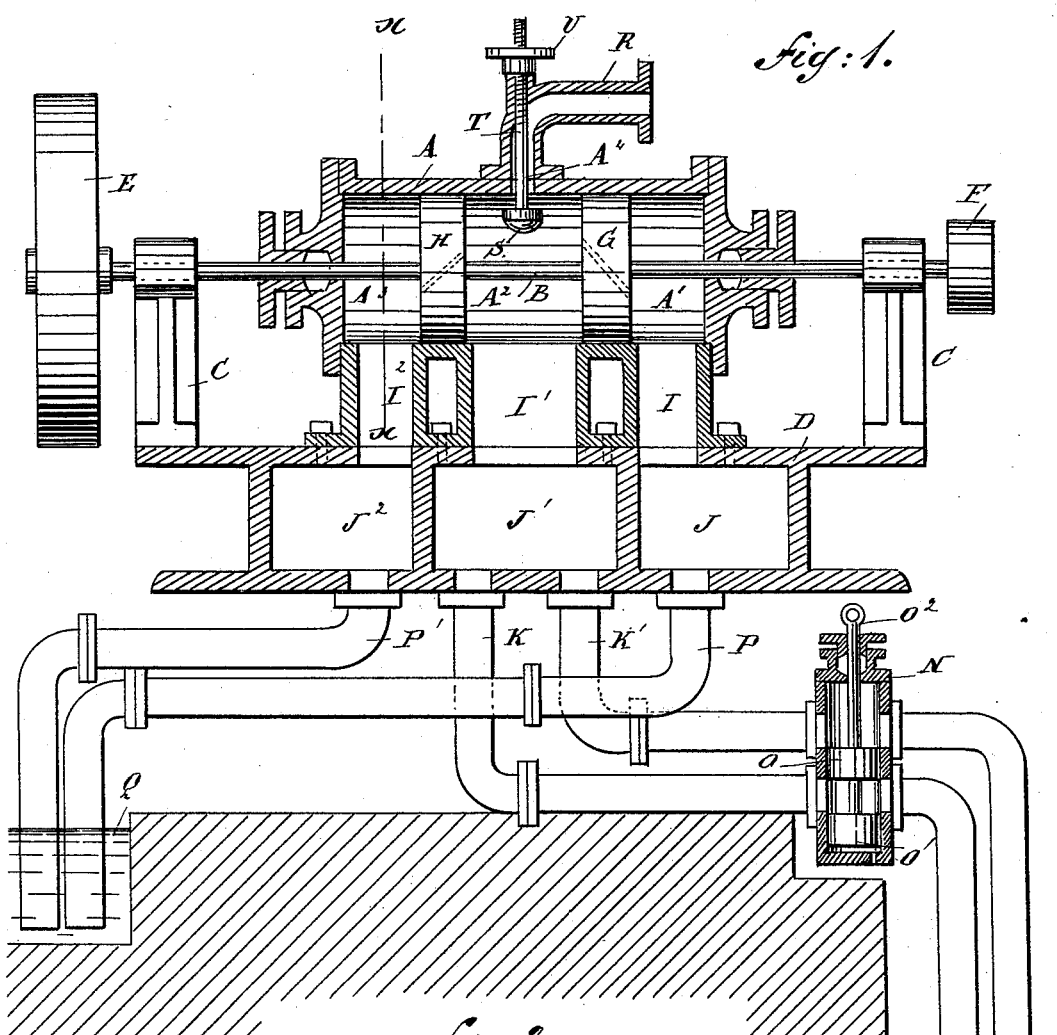
Fig: 1.
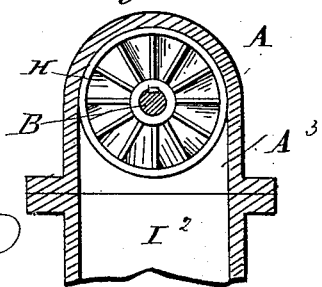
Fig: 2.
WITNESSES:
Chas. Nida
C. Sedgwick
INVENTOR:
H. P. Christiansen
BY Munn & Co.
ATTORNEYS

UNITED STATES PATENT OFFICE.

HANS PETTER CHRISTIANSEN, OF OAKLAND, CALIFORNIA, ASSIGNOR TO HIMSELF AND JENS HANSEN, OF SAME PLACE.

HYDRAULIC MOTOR.

SPECIFICATION forming part of Letters Patent No. 428,829, dated May 27, 1890.

Application filed December 27, 1889. Serial No. 335,106. (No model.)

*To all whom it may concern:*

Be it known that I, HANS PETTER CHRISTIANSEN, of Oakland, in the county of Alameda and State of California, have invented a new and Improved Hydraulic Motor, of which the following is a full, clear, and exact description.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in both figures.

Figure 1 is a sectional side elevation of the improvement, and Fig. 2 is a transverse section of the same on the line $x\ x$ of Fig. 1.

The improved hydraulic motor is provided with a cylinder A, through which passes centrally a main shaft B, mounted to turn near its outer ends in suitable bearings formed in the standards C, erected on a base-plate D, which also supports the cylinder A. On one end of the main shaft B is secured a fly-wheel E and on the other end is fastened a pulley F, for imparting a rotary motion to other machinery.

On the shaft B, inside of the cylinder A, are secured the turbine wheels G and H, of any approved construction, provided with the usual inclined wings which, however, stand in opposite directions in the two turbine wheels, as indicated in dotted lines in Fig. 1. The wheels G and H divide the interior of the cylinder A into the three compartments, $A'$, $A^2$, and $A^3$, connecting with the pipes I, $I'$, and $I^2$, respectively, leading to chambers J, $J'$, and $J^2$, respectively, formed on the under side of the base-plate D, as is plainly shown in Fig. 1.

From the chamber $J'$ lead the two pipes K and $K'$, which extend downward, then horizontally, and are then bent downward again to terminate at their lower ends in liquid L. On the lower end of each of the pipes K and $K'$ is arranged a valve $K^2$, which opens downward, as is plainly shown in Fig. 1. The chamber J is connected at its bottom with a pipe P, which extends downward, then horizontally, and then bends downward a short distance to extend into a liquid Q. A pipe $P'$ leads from the compartment $J^2$, and extends similarly to the pipe P, terminating in the liquid Q, as is plainly shown in Fig. 1. The level of the liquid Q is above the level of the liquid L, previously mentioned.

In the horizontal parts of the pipes K and $K'$ is arranged a valve-casing N, in which are mounted to slide the valves O and $O'$, adapted to open and close the pipes K and $K'$, as shown in Fig. 1. The valves O and $O'$ are secured on a stem $O^2$, extending through suitable stuffing-boxes in the valve-casing N, to be operated from the outside by hand or other suitable means. In the position shown in Fig. 1 the passages of the pipes K and $K'$ are unobstructed by the valves O and $O'$; but when the operator pulls on the stem $O^2$, which lifts the valves O and $O'$, the latter can close the passage-ways of the pipes K and $K'$.

In the top of the compartment $A^2$ of the cylinder A, is arranged a port $A^4$, registering with a pipe R, and adapted to be closed on the inside by a valve S, secured on a screw-rod T, passing through part of the pipe R, and provided on its outer end with a nut U, which, when turned, serves to raise or lower the valve S to open or close the port $A^4$.

The operation is as follows: In order to set the machine going it is necessary that the cylinder A, as well as the pipes I $I'$ $I^2$, the chambers J $J'$ $J^2$, and the pipes K $K'$ P $P'$, shall be filled, which is done through the pipe R, connected with the middle compartment $A^2$ of the cylinder A, the valves $K^2$ closing the lower ends of the pipes K $K'$, and the valve S being open. After filling, the valve S is closed by screwing on the nut U to raise the screw-rod T. The valves $K^2$ open themselves when the machine is started. Then the device constitutes a siphon, the level of the liquid Q being higher than the level of the liquid L, so that the liquid flows into the pipes P and $P'$ through the compartments J $J^2$ and the pipes $I'$ $I^2$ into the end compartments $A'$ and $A^3$, respectively, of the cylinder A. The liquid then passes through the turbine wheels H and G into the middle compartment $A^2$, thus rotating the turbine wheels G and H, which, on account of being secured to the driving-shaft B, rotate the latter, and the rotary motion of the shaft B can be transmitted to suitable machinery. The liquid, after flowing into the middle compartment A², passes through the enlarged pipe I' into the compartment J' and flows out through the pipes K and K'. When the operator desires to stop the motor, he raises the rod O², so that the valves O and O' close the passage-ways of the pipes K and K'. Then when the operator again desires to start the machine he simply moves the valves O and O' downward into their former position, as shown in Fig. 1, so that the flow of liquid continues as above described. When the operator desires to empty the motor of water, he turns the nut U, so as to move the screw-rod T downward, whereby the valve S opens the port A⁴ and atmospheric air is permitted to flow into the middle compartment A of the cylinder by means of the pipe R. This outside-air pressure forces the liquid in the machine through the pipes K and K'.

It is understood that the several connections are made water and air tight, so that the flow of the liquid will not be interrupted by leakage.

Having thus described my invention, I claim as new and desire to secure by Letters Patent—

1. The combination, with the cylinder, of a shaft mounted to turn therein, two water-wheels on said shaft and fitting the cylinder, two inlet-pipes leading to the ends of the cylinder beyond the wheels, a central outlet leading from the space between the wheels, two pipes leading from said central outlet, a valve-chamber connecting the two pipes, and a double valve within said chamber and controlling both pipes, and a stem for operating said valve, substantially as set forth.

2. In a hydraulic motor, the combination, with a cylinder, of a shaft mounted to turn in the said cylinder, two water-wheels secured on the said shaft fitting in the said cylinder and having their wings standing in opposite directions, inlet-pipes leading to the ends of the said cylinder at the outer sides of the said wheels, an outlet leading from the middle of the said cylinder between the said wheels and extending to a lower level than the said inlet-pipes, and a valve arranged in the said cylinder between the said wheels to fill the device or to let in atmospheric air, substantially as shown and described.

HANS PETTER CHRISTIANSEN.

Witnesses:
JENS HANSEN,
FREDREK CHELSEN.